Figure 3:
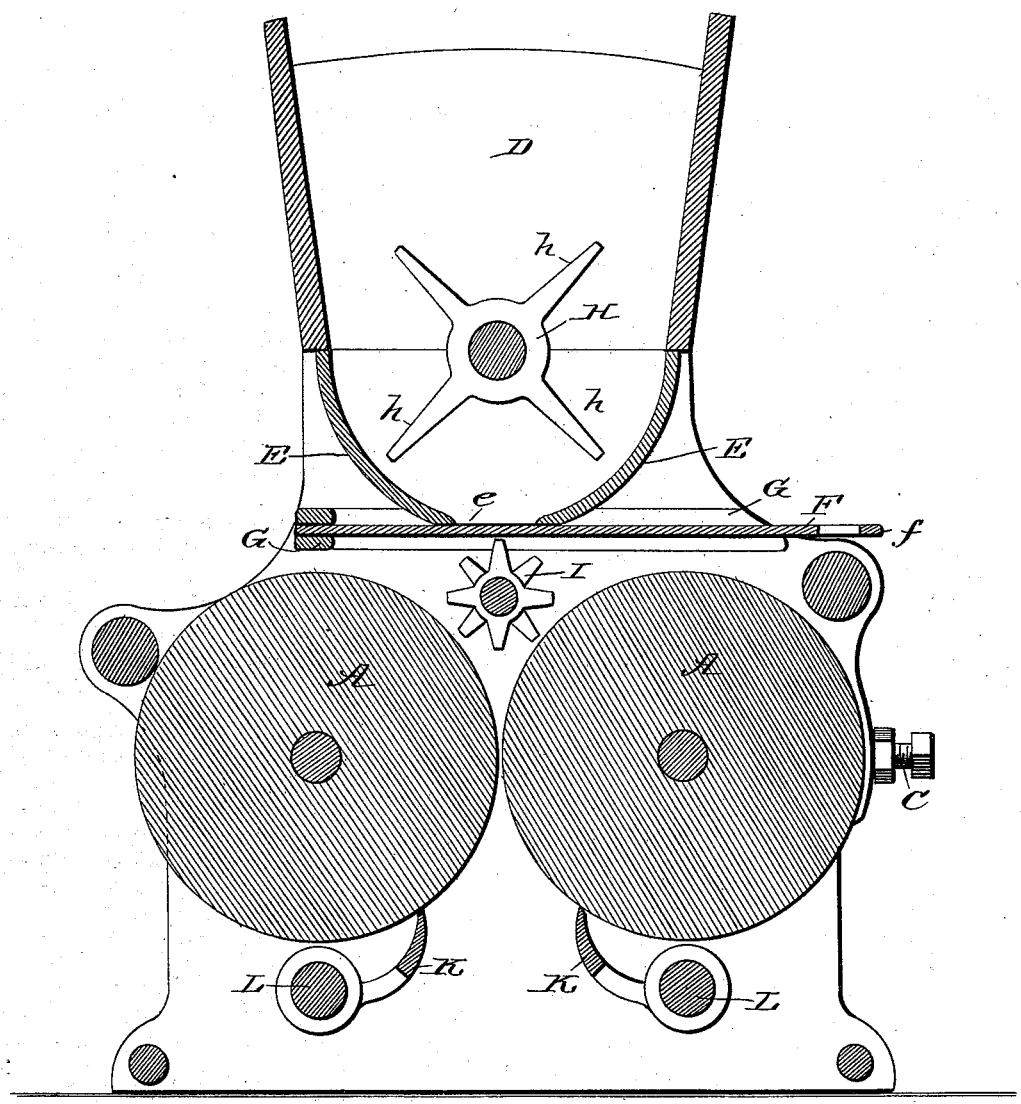

(No Model.) 2 Sheets—Sheet 1.
J. J. WOODWARD & P. B. BIBB.
COTTON SEED CRUSHER.
No. 402,289. Patented Apr. 30, 1889.
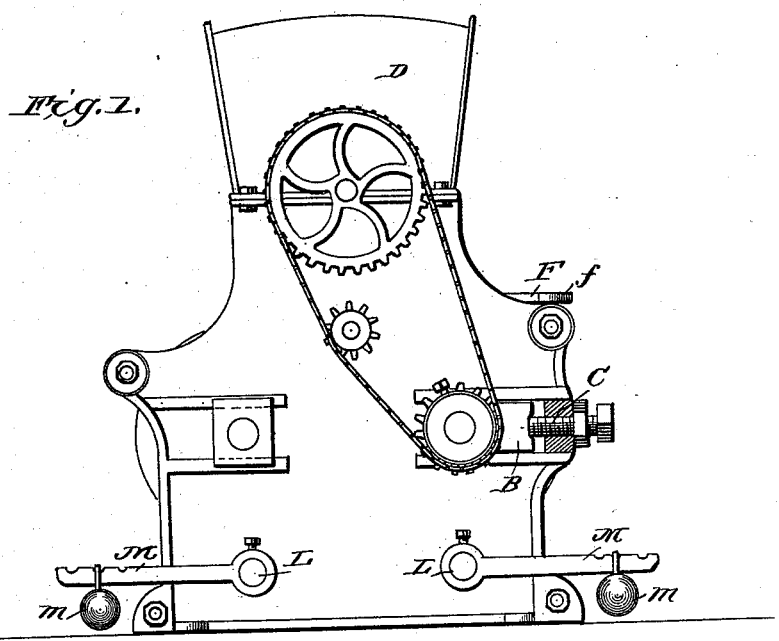
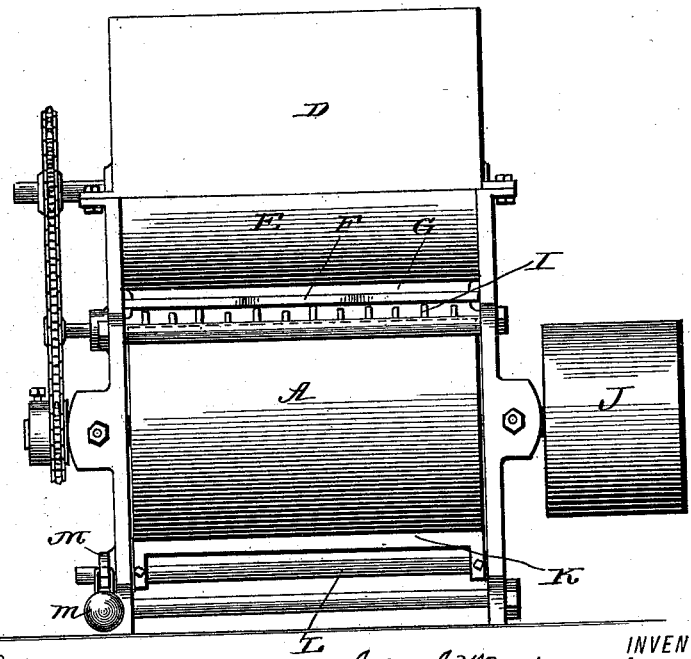
WITNESSES:
Fred G. Dieterich
Perry B. Turpin
INVENTOR,
John J. Woodward
Peyton B. Bibb
BY
ATTORNEYS (No Model.) 2 Sheets—Sheet 2.
J. J. WOODWARD & P. B. BIBB.
COTTON SEED CRUSHER.

No. 402,289. Patented Apr. 30, 1889.

WITNESSES:
Fred G. Dieterich
Perry B. Turpin

INVENTOR,
John J. Woodward
Peyton B. Bibb
BY Munn & Co
ATTORNEYS.

UNITED STATES PATENT OFFICE.

JOHN JEFFERSON WOODWARD AND PEYTON B. BIBB, OF MONTGOMERY, ALABAMA.

COTTON-SEED CRUSHER.

SPECIFICATION forming part of Letters Patent No. 402,289, dated April 30, 1889.

Application filed December 14, 1888. Serial No. 293,626. (No model.)

*To all whom it may concern:*

Be it known that we, JOHN JEFFERSON WOODWARD and PEYTON B. BIBB, of Montgomery, in the county of Montgomery and State of Alabama, have invented a new and useful Improvement in Cotton-Seed Crushers, of which the following is a specification.

This invention relates to machines for crushing cotton-seed; and it consists in certain novel constructions and combinations of parts, as will be hereinafter described and claimed.

In the drawings, Figure 1 is a side elevation, Fig. 2 a front elevation, and Fig. 3 a vertical section, of a machine constructed according to our invention.

The machine has a suitable frame, in which are journaled the crushing-rolls A A, one of which journals in boxes B, adjustably supported and engaged by screws C, so the rollers may be set to merely crack the cotton-seed and destroy its germ, or to grind the seed into meal, as may be desired.

The hopper D at the top of the machine has its bottom E rounded, and is provided with the discharge slot or opening e, arranged vertically over the bearing or meeting faces of the crushing-rolls. The cut-off slide or board F is supported in guides G, and is movable across opening e to close same when desired, the said board being extended at f in position to be grasped by the operator and adjusted to open or close the discharge-opening.

In the hopper above the cut-off slide is journaled the feeder H, having teeth or arms h of different lengths, while below such slide and immediately above the bearing-faces of the crushing-rolls is journaled what may be called the "clearing stirrer or distributer" I, the shafts of said feeder and distributer H I being extended through the framing, and provided with sprocket-gears connected by sprocket-chain with the sprocket on the shaft of one of the rolls A, which roll also has a band-pulley, J, to receive a band from a suitable drive-power to give motion to the machine.

The clearing-distributer I and its arrangement with reference to the feeder H and the cut-off F forms an important feature of our invention.

It will be noticed that this distributer I is arranged immediately above the meeting faces of the rolls A and is below the cut-off slide, the latter being arranged between the parts H and I. This distributer I takes the seed as it drops from the hopper, distributing it to the rolls, and thus prevents any choking of the latter. If at any time in running the machine it is found that the seed has been fed too freely and too much has accumulated immediately above the rolls A it is not necessary to stop the machine, but simply to close the cut-off, when the clearing-distributer will keep the seed agitated above the rolls and feed same gradually thereto in a free, loose, unclogged condition, avoiding any choking of the machine.

Scrapers K are arranged to bear against the rolls A on opposite sides of and below their meeting bearing-faces, such scrapers being in the construction shown supported on shafts L, having outwardly-extended arms M, weighted at m, so the scrapers may be caused to press firmly against the rolls and clear the crushed material therefrom.

Having thus described our invention, what we claim as new is—

In a crushing-machine, the combination of the hopper having a discharge-opening, the crushing-rolls arranged below such opening, the clearing-distributer arranged immediately above the meeting faces of said rolls, and the cut-off operating between said distributer and the discharge-opening of the hopper, all substantially as described, whereby in case the rolls become clogged the supply may be cut off, the clearing-distributer meanwhile operating to clear the said rolls, substantially as and for the purposes set forth.

JOHN JEFFERSON WOODWARD.
PEYTON B. BIBB.

Witnesses:
J. M. DAVIDSON,
JOHN P. KOHN.